R. H. WHITE.
TRACK LAYING TRACTOR.
APPLICATION FILED NOV. 18, 1918.
1,387,086.
Patented Aug. 9, 1921.
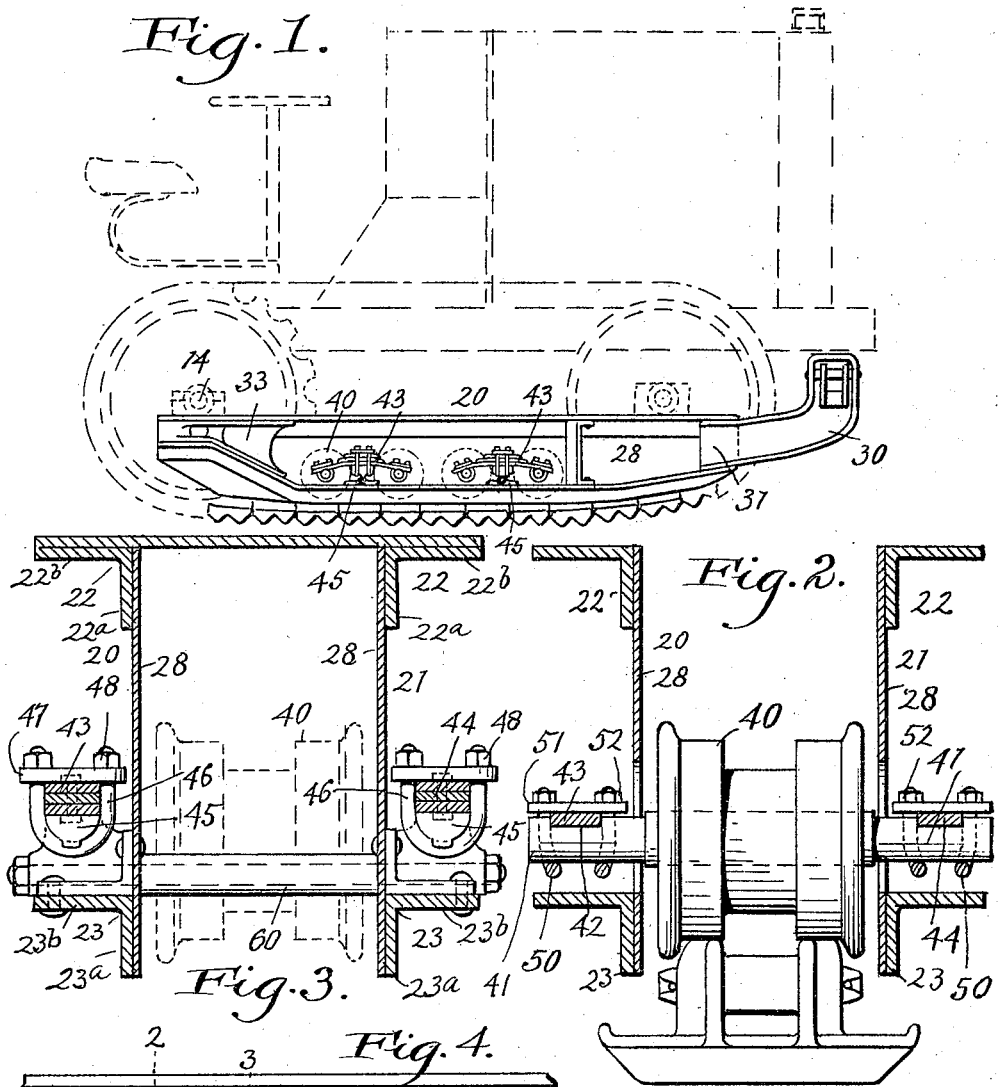
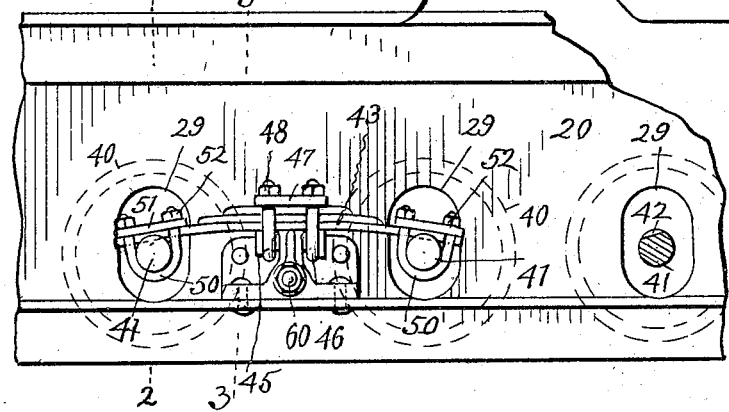

UNITED STATES PATENT OFFICE.

ROLLIN H. WHITE, OF CLEVELAND HEIGHTS, OHIO, ASSIGNOR TO THE CLEVELAND TRACTOR COMPANY, OF EUCLID, OHIO, A CORPORATION OF OHIO.

TRACK-LAYING TRACTOR.

1,387,086.   Specification of Letters Patent.   Patented Aug. 9, 1921.

Application filed November 18, 1918. Serial No. 262,937.

*To all whom it may concern:*

Be it known that I, ROLLIN H. WHITE, a citizen of the United States, residing at Cleveland Heights, in the county of Cuyahoga and State of Ohio, have invented a certain new and useful Improvement in Track-Laying Tractors, of which the following is a full, clear, and exact description.

This invention relates to the kind of track laying tractors which are typified by the tractor which forms the subject matter of my prior Patent No. 1,253,319, issued Jan. 15, 1918, in which each track belt is associated with the track frame and runs over two end wheels, one of which is a driving sprocket.

The present invention has to do with the mounting upon the truck frames of wheels located between the end wheels for engagement with the ground reaches of the track belt,—the objects being to yieldingly hold said ground reaches of the track belt in contact with the ground, however uneven it may be; to materially relieve the machine from the shocks and jars incident to traveling over very rough ground; and to accomplish these results by means which are inexpensive and are constructed and disposed so that they are equally accessible for repair and replacement whenever necessary.

The invention consists in the construction and combination of parts shown in the drawing and hereinafter described and pointed out definitely in the appended claims.

In the drawings, Figure 1 is a side elevation which shows in full lines and dotted lines a tractor in which the present invention is embodied, full lines showing a track frame which is the part of the tractor to which the present invention is applied. Fig. 2 is a vertical transverse section through said track frame in the plane indicated by line 2—2 on Fig. 4. Fig. 3 is a vertical transverse section in the plane of line 3—3 on Fig. 4. Fig. 4 is an enlarged side elevation of a part of one truck frame, and one pair of track wheels and the mechanism associated therewith.

The truck frame to which the present invention is applied, as shown in the drawings, is very much like that which is shown and described in my prior application No. 216,551, filed Feb. 11, 1918. Each truck frame is made up of two parallel vertically disposed longitudinally extended built up beams 20, 21, which are connected at their front ends by a yoke 30, and at their rear ends are hung upon lateral extensions of the rear axle 14.

Each beam comprises a straight upper tension member 22, and a bent lower compression member 23, which members are connected together at their front and rear ends, their front ends being connected to an arm 31 of the front yoke, and their rear ends being connected to an interposed block 33. Each tension member and each compression member is an angle bar. Each beam also includes the guard plate 28 which is riveted against the inside faces of the vertical webs $22^a$ and $23^a$ of said angle bars. Each angle bar has an outwardly extended flange that is a flange which extends away from the guard plate, the flanges of the upper members being indicated by $22^b$ and of the lower members by $23^b$.

It is to be understood, as a matter of course, that the present invention does not require the employment of track frame beams constructed precisely as described.

Associated with each truck frame are one or more pairs of track wheels 40, two of such pairs being shown in Fig. 1. Each of said track wheels is located between the guard plates 28 of the two track frame beams, and is rotatably mounted on a transverse shaft 41 which extends through holes 29 in both guard plates, and is secured to the ends of leaf springs 43, 44. There are two of such leaf springs associated with each pair of track wheels, and these are respectively secured in the manner shown to the outside face of the associated beams. Each leaf spring is secured to a spring seat block 45; and each spring seat block is secured to the associated beam. As a matter of fact, it rests upon and is secured to the outwardly projecting flange $23^b$ of the compression bar 23, and is likewise secured to the guard plate 28. Each spring seat block has the forwardly and rearwardly extended spring seat arms 45.

The middle part of each leaf spring rests upon the associated spring seat, (which is the top of the block and of the arms) and is secured thereto by U-bolts 46 which embrace the arms 45 and extend upward on opposite sides of the spring, the clamping plates 47 which rest upon said spring, and the nuts 48. The leaf springs extend forwardly and rearwardly from these spring seat blocks, and one of the shafts 41 extends between and is secured to the front ends of the two leaf springs, while the other shaft extends between and is secured to the rear ends of said two leaf springs.

Nonrotative connections between the shafts and leaf springs are made by forming in the shafts flat faced notches 42 in which the leaf springs are fitted. U-bolts 50 embrace the shafts and extend upward through clamping plates 51,—which clamping plates are held down upon these springs and in turn hold the springs in said notches by nuts 52.

The two track frame beams are held in spaced relationship adjacent the spring seat blocks, by transverse bolts 60 which extend through both guard plates and both spring seat blocks, and a sleeve which embraces said bolt between said beams and engages at its ends with the guard plates The specific features of the construction shown and described may be varied as desired; and are not to be regarded as essential parts of the constructions severally defined by the claims unless definitely specified in said claims.

Having described my invention, I claim:—

1. In a track laying tractor, the combination of a track frame comprising two longitudinally extended parallel connected side beams, each beam comprising two longitudinally extended angle bars and a guard plate secured to the inside faces of said angle bars, two spring seat blocks which are secured in transverse alinement to the outwardly extended flanges of the two lower angle bars, a leaf spring secured upon each of said spring seat blocks and extended forwardly and rearwardly therefrom, two transversely extended shafts which extend between and are fixed, the one to the front ends of the two springs and the one to the rear ends of the two springs, and track wheels rotatably mounted upon said shafts between the side beams of said track frame.

2 In a track laying tractor, the combination of a track frame comprising two connected longitudinally extended side beams, each beam comprising two longitudinally extended angle bars, a block extending between and connected with the rear ends of said angle bars, and a guard plate secured to the inside faces of said angle bars, two spring seat blocks which are secured in transverse alinement to the outwardly extended flanges of the two lower angle bars, a leaf spring secured upon each of said spring seat blocks and extended forwardly and rearwardly therefrom, two transversely extended shafts which extend between and are fixed, the one to the front ends of the two springs and the one to the rear ends of the two springs, track wheels rotatably mounted upon said shafts between the side beams of said track frame, and a transverse spacing bolt which extends between the two side beams and through the two transversely alined spring seat blocks and is bolted thereto.

In testimony whereof I hereunto affix my signature.

ROLLIN H WHITE.